United States Patent [19]

Walters et al.

[11] Patent Number: 4,836,180
[45] Date of Patent: Jun. 6, 1989

[54] GAS BURNER ADAPTOR MANIFOLD ASSEMBLY

[75] Inventors: Jon S. Walters, St. Louis, Mo.; Neil Boatwright, Warrick, Ind.

[73] Assignee: American General Products, Inc., Maryland Heights, Mo.

[21] Appl. No.: 182,343

[22] Filed: Apr. 18, 1988

[51] Int. Cl.<sup>4</sup> ............................................. F24C 3/00
[52] U.S. Cl. .................................. 126/41 R; 431/156
[58] Field of Search ................... 99/385, 450, 401; 126/41 R, 40, 25 R, 39 R, 39 E; 285/12; 431/354, 355, 156, 193, 356; 48/180.1

[56] References Cited

U.S. PATENT DOCUMENTS

| 4,462,384 | 7/1984 | Hitch | 126/41 R |
| 4,565,523 | 1/1986 | Berkelder | 431/354 |
| 4,679,544 | 7/1987 | Kozioc | 126/25 R X |

Primary Examiner—Harvey C. Hornsby
Assistant Examiner—K. O'Leary
Attorney, Agent, or Firm—Paul M. Denk

[57] ABSTRACT

A gas fired cooking grill having a twin burner element initially adapted for dual gas supply lines is disclosed as including an adaptor manifold for converting the twin burner element to a single burner element for a single gas supply line source. The adaptor manifold includes an enclosed chamber which is mounted in sealed engagement to the burner element and has an adjustable mounting for connection to a single gas supply line source.

5 Claims, 1 Drawing Sheet

GAS BURNER ADAPTOR MANIFOLD ASSEMBLY

BACKGROUND OF THE INVENTION

This invention relates to gas fired cooking grills, and more particularly, to gas fired cooking grills which are adapted to convert a twin burner element to a single burner element with a single gas supply line source.

Gas burner elements in gas fired cooking grills are subject to intense heat, corrosion and blocked passages. As a result, it is necessary to periodically replace the burner elements of gas fired barbecue grills Additionally, in the initial manufacture of gas burner elements, it is desirable to provide for ready interchangeability such that a twin burner element may be quickly and easily converted to a single burner element. Later, in field replacements, the same problem exists in converting twin burner elements to a single burner element where it is desired to minimize the cost of parts and installation. While not currently available from prior art structures and techniques, it is desirable to provide for the ready convertion of a twin burner element to a single burner element in gas fired cooking grills, for all of the aforementioned circumstances.

SUMMARY OF THE INVENTION

Accordingly, it is an object of the present invention to provide an adaptor manifold which converts a twin burner element to a single burner element in a gas fired cooking grill.

Another object of the present invention is to provide the aforementioned adaptor manifold which quickly and easily converts a twin burner element to a single burner element, when initially manufactured, or subsequently during burner element replacement.

A further object of the present invention is to provide the aforementioned adaptor manifold which uses a minimum number of parts, and yet affords a stable and concealed mounting to a twin burner element for converting it to a single burner element.

Other objects and advantages of the present invention include low cost conversion, adaptability to a variety of burner elements, and adjustability to meet manufacturing variations.

Briefly stated, the invention contemplates the conversion of a twin burner element, having dual gas supply lines in a gas fired cooking grill, to a single burner element having a single gas supply line source through the use of an adaptor manifold which is mounted to the burner element to enclose dual gas supply line openings. The adaptor manifold includes circumferentially extending flange means with a sealing gasket mounted thereon for sealing engagement with the burner element when the circumferentially extending flange means is mounted to the burner element. For mounting the adaptor manifold, fastener means extend through the adaptor manifold including the circumferentially extending flange means and attach the adaptor manifold to the burner element for stable mounting. The adaptor manifold is also adjustably mounted to the single gas supply line source to facilitate ready conversion.

Other features and advantages of the invention will become apparent during the course of the ensuing description.

DESCRIPTION OF THE PREFERRED EMBODIMENT

Figure 1:
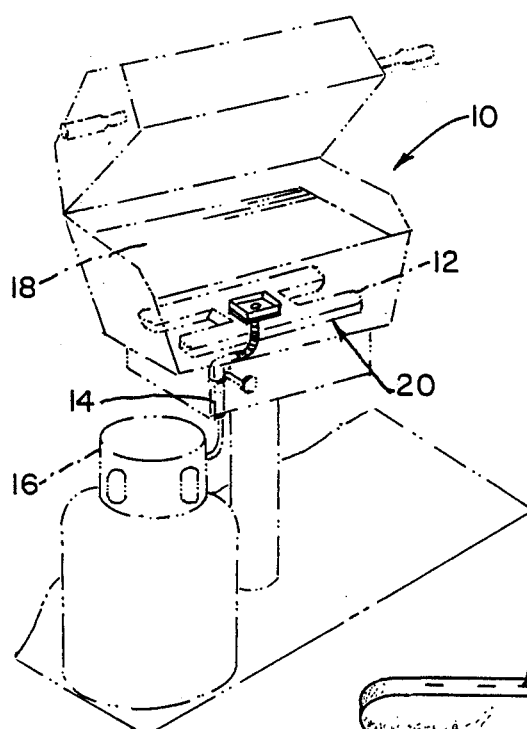
FIG. 1 is an isometric view showing a typical gas fired cooking grill in phantom lines, since it forms no part of the present invention, and specifically showing in full lines the adaptor manifold assembly which is constructed in accordance with the teachings of the present invention.
Figure 4:
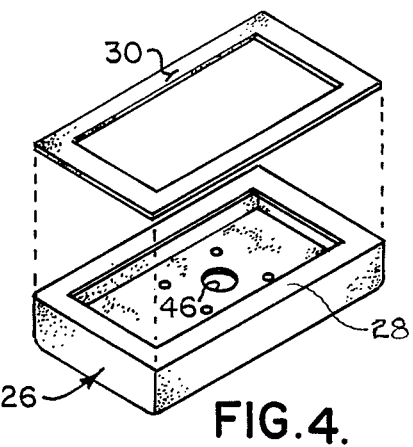
FIG. 4 is an exploded isometric view depicting the adaptor manifold and its associated sealing gasket.

The gas fired cooking grill 10, essentially shown in phantom lines in FIG. 1 of the drawings, includes a gas burner element 12 to which gas is delivered via the supply line 14 which is connected to a propane gas tank 16. As is well known, opening a shut off valve in the supply line 14 enables gas to be delivered to the burner element 12 which can be lit by a user to then direct flames upwardly for cooking food products on the grill 18. The adaptor manifold assembly for converting a twin burner element to a single burner element is generally identified at 20 in FIG. 1 of the drawings.

Figure 2:
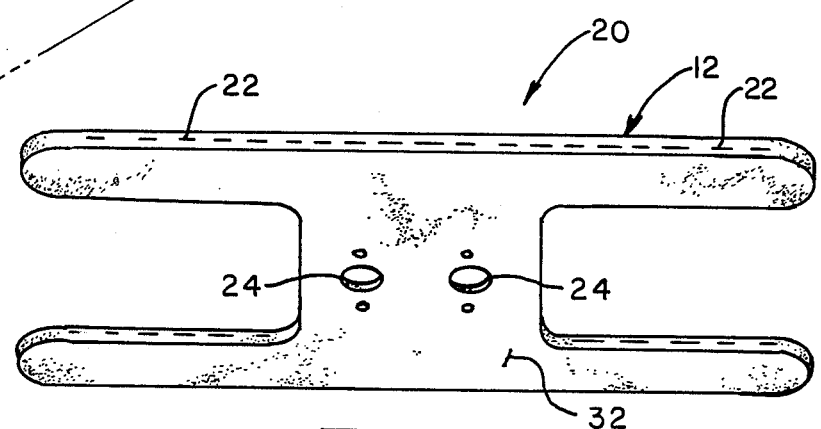
FIG. 2 is an exploded isometric view of the adaptor manifold assembly.

As best seen in FIG. 2 of the drawings, the gas burner element 12 is substantially H-shaped in accordance with conventional practice and is provided entirely around its perimeter with gas flame apertures 22 in closely spaced relationship. As can be seen in FIG. 1 of the drawings, the burner element typically spans the interior of the grill body for which it is designed to fit substantially between the side and end walls of the grill 10. The gas burner element 12 is a twin burner element in that a pair of spaced openings 24 provided in the lower face thereof have been provided for receiving dual gas supply lines (not shown) for the twin burner element 12.

Where it is desired to convert the twin burner element to a single burner element, either during initial manufacture or in replacement of the burner element and its components, the present invention provides an adaptor manifold 26 which converts the twin burner element to a single burner element having a single gas supply line source. The adaptor manifold 26 is essentially a rectangular shaped box-like component with a circumferentially extending inwardly directed flange 28 at its upper end upon which is mounted a sealing gasket 30 for sealing engagement with the lower face 32 of the burner element. The adaptor manifold 26 includes a lower end 34 for connection to a single gas line supply line source, as will be described.

Figure 3:
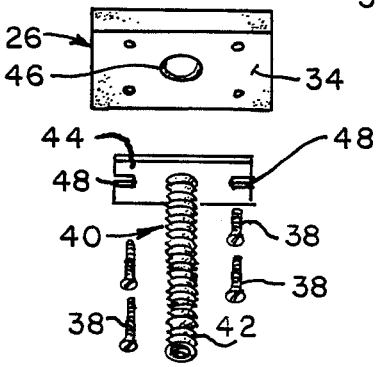
FIG. 3 is a side elevational view, partly in section, showing the mounting of the adaptor manifold to a burner element in a gas fired cooking grill.
Figure 3:
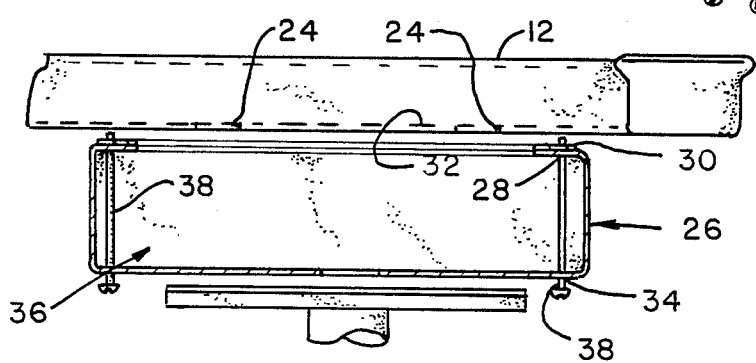

In mounting the adaptor 26 to the burner element 12, threaded fasteners 38 are provided and extend through the lower end 34 and/or the circumferentially extending flange 28 of the adaptor manifold 26 for direct mounting of the manifold 26 to the lower face 32 of the burner element 12 as shown in FIGS. 2 and 3 of the drawings. When mounted to the burner element 12 as shown in FIG. 3 of the drawings, the adaptor manifold 26 defines an enclosed chamber 36 which covers the spaced openings 24 in the burner element 12. In this way, the adaptor manifold converts the twin burner element 12 and its spaced openings to a single burner element having a single supply line source 40 which is mounted to the lower end 34 of the adaptor manifold 26.

The single gas supply line source 40 is preferably constructed in accordance with our co-pending patent application Ser. No. 127,425 filed Dec. 2, 1987, entitled Adjustable Gas Tube Assembly. The singe gas supply line source 40 includes a gas delivery tube 42 having an adjustable bracket 44 mounted to the upper end thereof for attachment to the lower end 34 of the adaptor manifold It will be noted that the lower end 34 of the adaptor manifold includes an opening 46 which has a corresponding size and shape relative to the gas delivery tube 42 for communication therewith. The bracket 44 has opposed slots 48 formed therein for receiving fasteners to mount the bracket in an adjustable mounted position relative to the lower end 34 of the adaptor manifold 26 for corresponding communication and alignment with the opening 46. Sealing gasket means may also be provided between the bracket 44 and the lower end 34 of the adaptor manifold 26 surrounding the opening 46 to assure that there will be no gas leakage.

As can be seen from the forgoing, the adaptor manifold 26 readily permits conversion of the twin burner element 12 to a single burner element, and thereby achieves the aforementioned objects and advantages of the present invention. The adaptor manifold 26 is mounted to the burner element 12 in a stable and sealed relationship, while at the same time permitting adjustment relative to the single gas supply source 40.

As various changes could be made in the above constructions without departing from the scope of the invention, it is intended that all matter contained in the above description or shown in the accompanying drawing shall be interpreted as illustrative and not in a limiting sense.

We claim:

1. In a gas fired cooking grill having a twin burner element with spaced openings in a lower face thereof initially adapted for dual gas supply lines for the twin burner element, the improvement comprising: an adaptor manifold for converting the twin burner element to a single burner element having a single gas supply line source, said adaptor manifold defining an enclosed chamber having an upper end mounted to the lower face of said burner element and covering said spaced openings within the enclosed chamber, and said adaptor element further having a lower end connected to a single gas supply line source.

2. In a gas fired cooking grill as defined in claim 1 wherein the upper end of said adaptor manifold includes circumferentially extending flange means with a sealing gasket mounted thereon for sealing engagement width the lower face of said burner element when the circumferentially extending flange means of said adaptor manifold is mounted thereto.

3. In a gas fired cooking grill as defined in claim 2 wherein said adaptor manifold is mounted to the lower face of said burner element by fastener means extending through the lower end and circumferentially extending flange means of said adaptor manifold for attachment to said burner element.

4. In a gas fired cooking grill as defined in claim 3 and including bracket means adjustably mounted to the lower end of said adaptor manifold, said bracket means being connected to a single gas supply line source.

5. In a gas fired cooking grill as defined in claim 4 wherein the lower end of said adaptor manifold has an opening formed therein which is complementarily configured and dimensioned relative to a corresponding opening in the bracket means associated with the single gas supply line source.

* * * * *